US011631077B2

(12) United States Patent
Zappier et al.

(10) Patent No.: US 11,631,077 B2
(45) Date of Patent: Apr. 18, 2023

(54) SYSTEM FOR FACILITATING SECURE ELECTRONIC COMMUNICATIONS BETWEEN ENTITIES AND PROCESSING RESOURCE TRANSFERS

(71) Applicant: HashLynx Inc., Middletown, NY (US)

(72) Inventors: Paul Zappier, Middletown, NY (US); Nicholas Paul Zappier, Middletown, NY (US)

(73) Assignee: HashLynx Inc., Middletown, NY (US)

( * ) Notice: Subject to any disclaimer, the term of this patent is extended or adjusted under 35 U.S.C. 154(b) by 733 days.

(21) Appl. No.: 15/857,093

(22) Filed: Dec. 28, 2017

(65) Prior Publication Data

US 2018/0204213 A1 Jul. 19, 2018

Related U.S. Application Data

(60) Provisional application No. 62/446,953, filed on Jan. 17, 2017.

(51) Int. Cl.
*G06Q 20/38* (2012.01)
*H04L 9/32* (2006.01)
(Continued)

(52) U.S. Cl.
CPC ..... *G06Q 20/38215* (2013.01); *H04L 9/0819* (2013.01); *H04L 9/3215* (2013.01);
(Continued)

(58) Field of Classification Search
CPC ... H04L 9/0819; H04L 9/3215; H04L 63/065; H04L 9/0637; G06Q 20/38215
(Continued)

(56) References Cited

U.S. PATENT DOCUMENTS

| 5,671,283 A | 9/1997 | Michener et al. |
| 5,835,599 A | 11/1998 | Buer |

(Continued)

FOREIGN PATENT DOCUMENTS

| WO | 2014162296 A1 | 10/2014 |
| WO | 2015135018 A1 | 9/2015 |

OTHER PUBLICATIONS

Bradley Hope et al., "A Bitcoin Technology Gets Nasdaq Test"; May 10, 2015; retrieved from http://www.wsj.com/articles/a-bitcoin-technology-gets-nasdaq-test-1431296886.
(Continued)

*Primary Examiner* — Neha Patel
*Assistant Examiner* — Yin Y Choi
(74) *Attorney, Agent, or Firm* — Stradley Ronon Stevens & Young, LLP

(57) ABSTRACT

Embodiments of the present invention provide a system for utilizing one or more decentralized applications to allow entities to interface with a blockchain for the purposes of conducting a resource transfer. Typically, the blockchain is a permissioned blockchain which may be accessed only by the entities involved in the resource transfer. The decentralized applications may communicate with the legacy systems within each entity through an application programming interface (API) such that the data stored on the legacy systems may be governed by the blockchain. This ensures the authenticity of the data stored on the legacy systems while preventing the possibility of disparate versions of data being created over time.

18 Claims, 6 Drawing Sheets

(51) Int. Cl.
  *H04L 9/40* (2022.01)
  *H04L 9/08* (2006.01)
  *H04L 9/06* (2006.01)
  *H04L 9/00* (2022.01)

(52) U.S. Cl.
  CPC .......... *H04L 9/3239* (2013.01); *H04L 63/065* (2013.01); *H04L 63/08* (2013.01); *H04L 63/10* (2013.01); *G06Q 2220/00* (2013.01); *H04L 9/0637* (2013.01); *H04L 9/50* (2022.05); *H04L 2209/56* (2013.01)

(58) Field of Classification Search
  USPC .......................................................... 705/71
  See application file for complete search history.

(56) References Cited

U.S. PATENT DOCUMENTS

| | | | |
|---|---|---|---|
| 6,073,234 | A | 6/2000 | Kigo et al. |
| 6,324,286 | B1 | 11/2001 | Lai et al. |
| 6,725,303 | B1 | 4/2004 | Hoguta et al. |
| 6,850,252 | B1 | 2/2005 | Hoffberg |
| 6,973,187 | B2 | 12/2005 | Gligor et al. |
| 7,055,039 | B2 | 5/2006 | Chavanne et al. |
| 7,092,400 | B2 | 8/2006 | Malzahn |
| 7,184,549 | B2 | 2/2007 | Sorimachi et al. |
| 7,362,859 | B1 | 4/2008 | Robertson et al. |
| 7,392,384 | B2 | 6/2008 | Hopkins et al. |
| 7,428,306 | B2 | 9/2008 | Celikkan et al. |
| 7,502,933 | B2 | 3/2009 | Jakobsson et al. |
| 7,574,401 | B1 | 8/2009 | Burns |
| 7,649,992 | B2 | 1/2010 | Raju et al. |
| 7,764,788 | B2 | 7/2010 | Tardo |
| 7,979,889 | B2 | 7/2011 | Gladstone et al. |
| 8,078,874 | B2 | 12/2011 | You et al. |
| 8,107,621 | B2 | 1/2012 | Celikkan et al. |
| 8,155,311 | B2 | 4/2012 | Shin et al. |
| 8,259,934 | B2 | 9/2012 | Karroumi et al. |
| 8,358,781 | B2 | 1/2013 | Schneider |
| 8,396,209 | B2 | 3/2013 | Schneider |
| 8,397,841 | B1 | 3/2013 | Griffo et al. |
| 8,416,947 | B2 | 4/2013 | Schneider |
| 8,458,461 | B2 | 6/2013 | Tardo |
| 8,464,320 | B2 | 6/2013 | Archer et al. |
| 8,516,266 | B2 | 8/2013 | Hoffberg et al. |
| 8,590,055 | B2 | 11/2013 | Yoon et al. |
| 8,737,606 | B2 | 5/2014 | Taylor et al. |
| 8,942,374 | B2 | 1/2015 | Fujisaki |
| 8,983,063 | B1 | 3/2015 | Taylor et al. |
| 9,059,866 | B2 | 6/2015 | Bar-Sade et al. |
| 9,083,702 | B2 | 7/2015 | Wied et al. |
| 9,092,766 | B1 | 7/2015 | Bedier et al. |
| 9,298,806 | B1 | 3/2016 | Vessenes et al. |
| 9,635,000 | B1 | 4/2017 | Muftic |
| 9,642,012 | B1* | 5/2017 | Dasgupta et al. |
| 9,672,499 | B2 | 6/2017 | Yang et al. |
| 10,521,780 | B1* | 12/2019 | Hopkins et al. |
| 10,536,265 | B2* | 1/2020 | Tong |
| 2004/0172535 | A1 | 9/2004 | Jakobsson et al. |
| 2005/0256802 | A1 | 11/2005 | Ammermann et al. |
| 2009/0281948 | A1 | 11/2009 | Carlson |
| 2010/0279653 | A1 | 11/2010 | Poltorak |
| 2011/0078073 | A1 | 3/2011 | Annappindi |
| 2011/0197064 | A1 | 8/2011 | Garcia Morchon et al. |
| 2012/0284175 | A1 | 11/2012 | Wilson et al. |
| 2013/0198061 | A1 | 8/2013 | Dheer et al. |
| 2013/0232056 | A1 | 9/2013 | Schulman |
| 2014/0006185 | A1 | 1/2014 | Zurn et al. |
| 2014/0089243 | A1 | 3/2014 | Oppenheimer |
| 2014/0310171 | A1 | 10/2014 | Grossman et al. |
| 2015/0172053 | A1 | 6/2015 | Schwarz et al. |
| 2015/0206106 | A1 | 7/2015 | Yago |
| 2015/0242643 | A1* | 8/2015 | Hankins et al. |
| 2015/0332283 | A1 | 11/2015 | Witchey |
| 2015/0379510 | A1 | 12/2015 | Smith |
| 2015/0379636 | A1 | 12/2015 | Szabo et al. |
| 2016/0012424 | A1 | 1/2016 | Simon et al. |
| 2016/0028552 | A1 | 1/2016 | Spanos et al. |
| 2016/0050203 | A1 | 2/2016 | Hefetz |
| 2016/0092874 | A1 | 3/2016 | O'Regan et al. |
| 2016/0125376 | A1 | 5/2016 | Beatty et al. |
| 2016/0191243 | A1 | 6/2016 | Manning |
| 2016/0275461 | A1 | 9/2016 | Sprague et al. |
| 2016/0292672 | A1 | 10/2016 | Fay et al. |
| 2016/0321654 | A1 | 11/2016 | Lesavich et al. |
| 2016/0323109 | A1 | 11/2016 | McCoy et al. |
| 2016/0342978 | A1 | 11/2016 | Davis et al. |
| 2016/0342989 | A1 | 11/2016 | Davis |
| 2016/0342994 | A1 | 11/2016 | Davis |
| 2017/0005804 | A1* | 1/2017 | Zinder |
| 2017/0046526 | A1 | 2/2017 | Chan et al. |
| 2017/0046664 | A1 | 2/2017 | Haldenby et al. |
| 2017/0046680 | A1 | 2/2017 | Crites |
| 2017/0091397 | A1 | 3/2017 | Shah |
| 2017/0103167 | A1 | 4/2017 | Shah |
| 2017/0103461 | A1 | 4/2017 | Acua-Rohter et al. |
| 2017/0116693 | A1 | 4/2017 | Rae et al. |
| 2017/0132626 | A1 | 5/2017 | Kennedy |
| 2017/0132630 | A1 | 5/2017 | Castinado et al. |
| 2017/0140375 | A1 | 5/2017 | Kunstel |
| 2017/0163733 | A1 | 6/2017 | Grefen et al. |
| 2017/0177855 | A1 | 6/2017 | Costa Faidella et al. |
| 2017/0178131 | A1 | 6/2017 | Fernandez et al. |
| 2017/0178237 | A1 | 6/2017 | Wong |
| 2017/0180134 | A1 | 6/2017 | King |
| 2017/0200137 | A1 | 7/2017 | Vilmont |
| 2017/0213209 | A1 | 7/2017 | Dillenberger |
| 2017/0214675 | A1 | 7/2017 | Johnsrud et al. |
| 2017/0214698 | A1 | 7/2017 | Hughes et al. |
| 2017/0220998 | A1 | 8/2017 | Horn et al. |
| 2017/0221052 | A1 | 8/2017 | Sheng et al. |
| 2017/0223005 | A1 | 8/2017 | Birgisson et al. |
| 2017/0228447 | A1 | 8/2017 | Catania et al. |
| 2017/0230378 | A1 | 8/2017 | Bliss |
| 2017/0235955 | A1 | 8/2017 | Barkan |
| 2017/0236407 | A1 | 8/2017 | Rhoads et al. |
| 2017/0243020 | A1 | 8/2017 | Dhondse et al. |
| 2018/0075527 | A1* | 3/2018 | Nagla et al. |
| 2018/0285879 | A1* | 10/2018 | Gadnis et al. |
| 2018/0322597 | A1* | 11/2018 | Sher |
| 2019/0280855 | A1* | 9/2019 | Tong |
| 2019/0341134 | A1* | 11/2019 | Shah |

OTHER PUBLICATIONS

Nathaniel Popper, "Bitcoin Technology Piques Interest On Wall Street"; Aug. 28, 2015 retrieved from http://www.nytimes.com/2015/08/31/business/dealbook/bitcoin-techno, Aug. 31, 2015.
Joseph C. Guagliardo et al., "Blockchain: Preparing for Disruption Like It's the '90s"; Mar. 14, 2016, retrieved from http://www.law360.com/articles/77120CVprint?section=ip.
Robert McMillian, "IBM Bets on Bitcoin Ledger"; Feb. 16, 2016, retrieved from http://www.wsj.com/articles/IBM-bets-on-bitcoin-ledger-1455598864.
Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.
Buterin, Vitalik, "On Public and Private Blockchains", Aug. 7, 2015, https://blog.ethereum.org/2015/08/07/on-public-and-private-blockchains/.
TASCA. "Digital Currencies: Principles, Trends, Opportunities, and Risks." Trends, Opportunities, and Risks. Sep. 7, 2015 (Sep. 7, 2015); Retrieved from https://www.researchgate.net/profile/Paolo_Tasca/publication/290805276_Digital_Currencies_Principles_Trends_Opportunities_and_Risks/Links569bb91e)8ae6169e562552.pif, p. 1, 5, 10, 12, 14.
Lerner. "Mavepay, A New Lightweight Payment Scheme for Peer to Peer Currency Networks." Apr. 17, 2012 ((Apr. 17, 2012) Retrieved

(56) References Cited

OTHER PUBLICATIONS from <https://pdfs.semanticscholar.org/1185/a26f014678b959876519065c2624458d75b8.pdf>. Entire documen.
Malahov, Yanislav Georgiev, "BitAlias 1, Aka Usernames for Bitcoin, A New, Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015, 6 pages.
PCT International Searching Authority; International Search Report and Written Opinion for PCT/US2016/061402 dated Dec. 27, 2016.
PCT International Searching Authority; International Search Report and Written Opinion for PCT/US2016/01655 dated Mar. 11, 2017.

\* cited by examiner

SYSTEM FOR FACILITATING SECURE ELECTRONIC COMMUNICATIONS BETWEEN ENTITIES AND PROCESSING RESOURCE TRANSFERS

CROSS REFERENCE TO PRIORITY APPLICATION

This application claims priority to U.S. Provisional Application Ser. No. 62/446,953, filed Jan. 17, 2017, entitled "Blockchain Dashboard to Facilitate Loan Settlement and Trade Closings," the entirety of which is hereby incorporated by reference.

FIELD OF THE INVENTION

The present invention relates to a system for utilizing decentralized applications to facilitate resource transfers using a blockchain. In particular, the invention utilizes decentralized applications to integrate an entity's legacy systems and applications with a permissioned blockchain, such that the entity's legacy systems may access, read, and write to the blockchain.

BACKGROUND

When conducting resource transfers, each entity involved typically uses individual databases to store data needed to conduct the resource transfer. Such traditional methods of conducting resource transfer pose a number of technical challenges. For instance, the data stored on the individual databases may be easily modified or improperly accessed. Furthermore, the data stored on the individual databases generally must be manually reconciled across all of the entity databases involved in the resource transfer process, which may lead to inconsistent versions of data being stored across the centralized databases. This may in turn lead to inefficiencies in the resource transfer process that must first be resolved before the resource transfer may be completed. Accordingly, there is a need for a more secure, reliable way to store data relating to resource transfers, while at the same time allowing various disparate systems to access and use such data.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for utilizing one or more decentralized applications to allow entities to interface with a blockchain for the purposes of conducting a resource transfer. Typically, the blockchain is a permissioned blockchain which may be accessed only by the entities involved in the resource transfer. The decentralized applications may communicate with the legacy systems within each entity through an application programming interface (API) such that the data stored on the legacy systems may be governed by the blockchain. This ensures the authenticity of the data stored on the legacy systems while preventing the possibility of disparate versions of data being created over time.

Accordingly, embodiments of the present invention provide a system, computer program product, and computer-implemented method for integrating legacy systems with a blockchain. The invention comprises receiving, via a blockchain dashboard, a request from a first user to access the blockchain; receiving authentication credentials from the first user; determining, based on validating the authentication credentials of the first user, that the first user is authorized to access at least one decentralized application; receiving, from the user, a request to upload a data file to the blockchain, wherein the data file is associated with a first transaction; detecting, via a consensus algorithm, that the data file is valid; appending the data file to a block in the blockchain, wherein the block comprises a transaction address and a transaction ID; and automatically updating a legacy system with the transaction address and the transaction ID.

In some embodiments, the invention further comprises detecting a status of the first user; in response to detecting the status of the first user, determining that the first user is authorized to access a set of decentralized applications; and displaying, via the blockchain dashboard, the set of decentralized applications on a graphical interface.

In some embodiments, the invention further comprises detecting a status of a second user; in response to detecting the status of the second user, determining that the second user is restricted from accessing a first decentralized application; and displaying, via the blockchain dashboard, a set of decentralized applications on a graphical interface, wherein the set of decentralized applications excludes the first decentralized application.

In some embodiments, the invention further comprises receiving, from a second user, a request to view a set of encrypted data records on the blockchain; receiving authentication credentials from the second user, wherein the authentication credentials comprises a cryptographic key; determining, based on validating the authentication credentials of the second user, that the second user is authorized to access the set of encrypted data records; and decrypting the set of encrypted data records using the cryptographic key.

In some embodiments, the invention further comprises detecting that a status of the first transaction has been changed; and displaying, via a graphical interface, a push notification to the first user through the blockchain dashboard.

In some embodiments, the legacy system is connected to the blockchain via an application programming interface.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
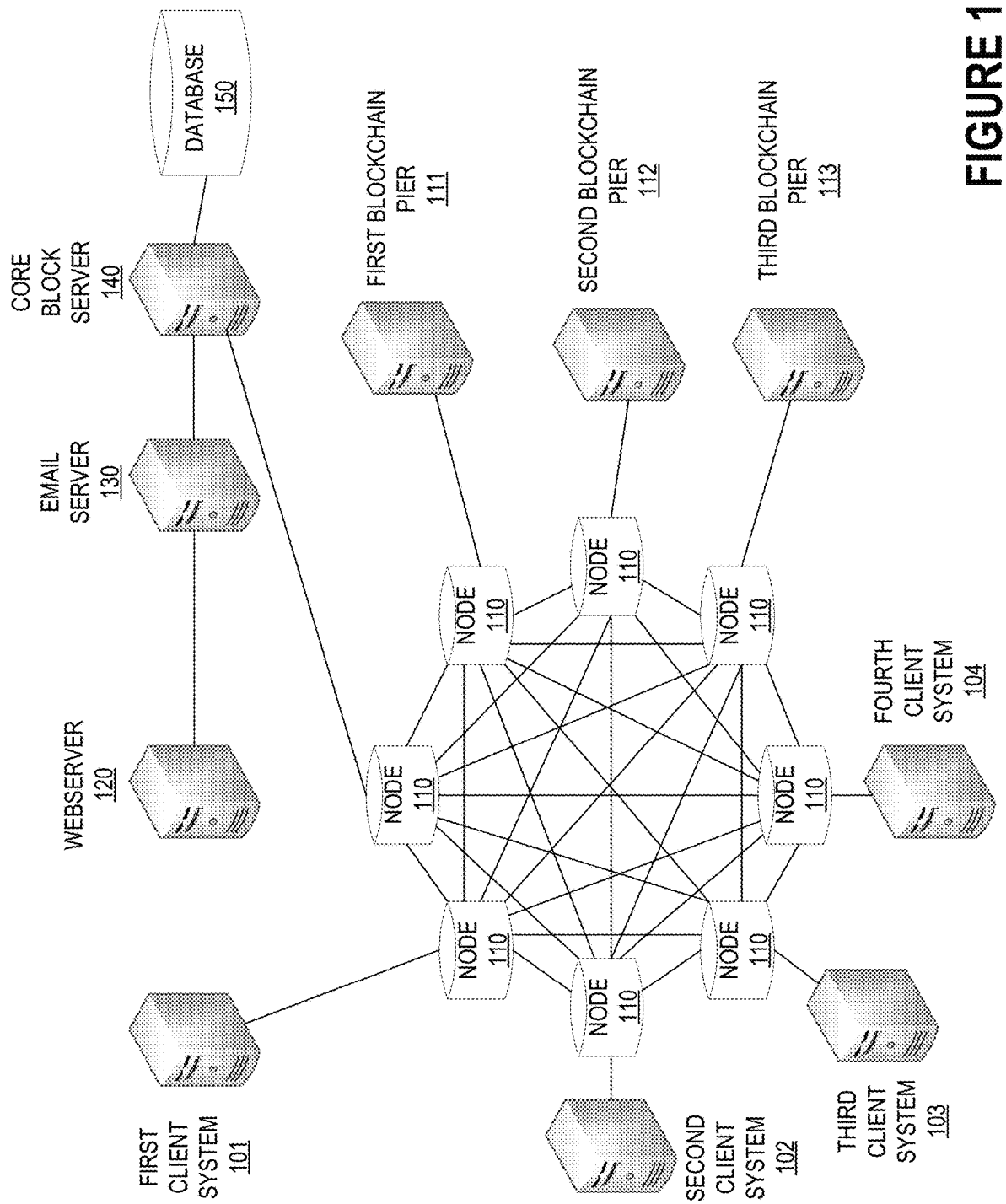

Having thus described embodiments of the invention in general terms, reference will now be made to the accompanying drawings, where:

FIG. 1 is a system diagram illustrating a blockchain environment, in accordance with embodiments of the present invention.

Figure 2:
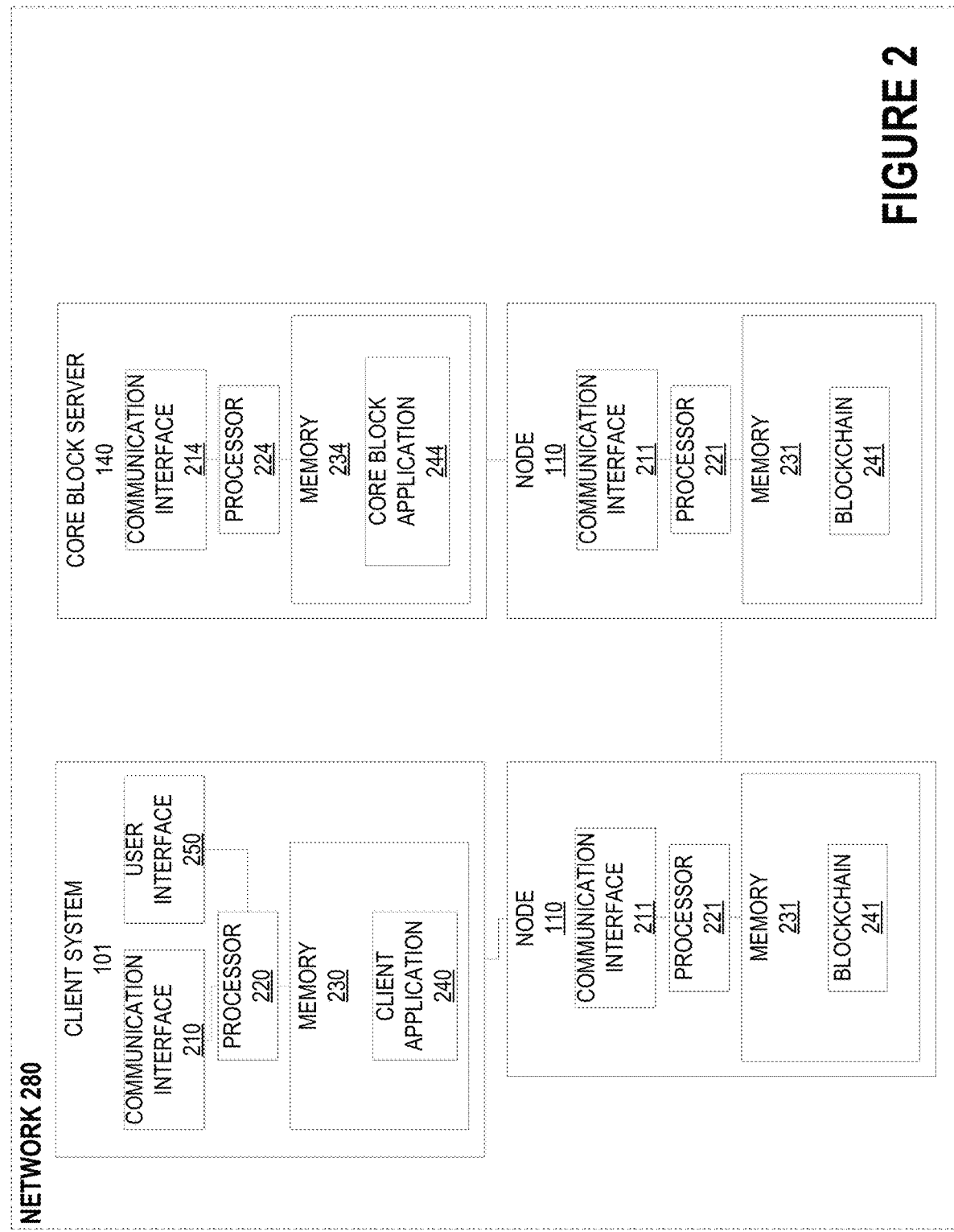

FIG. 2 presents a block diagram illustrating the client systems, nodes, and core block server in more detail, in accordance with one embodiment of the present invention.

Figure 3A:
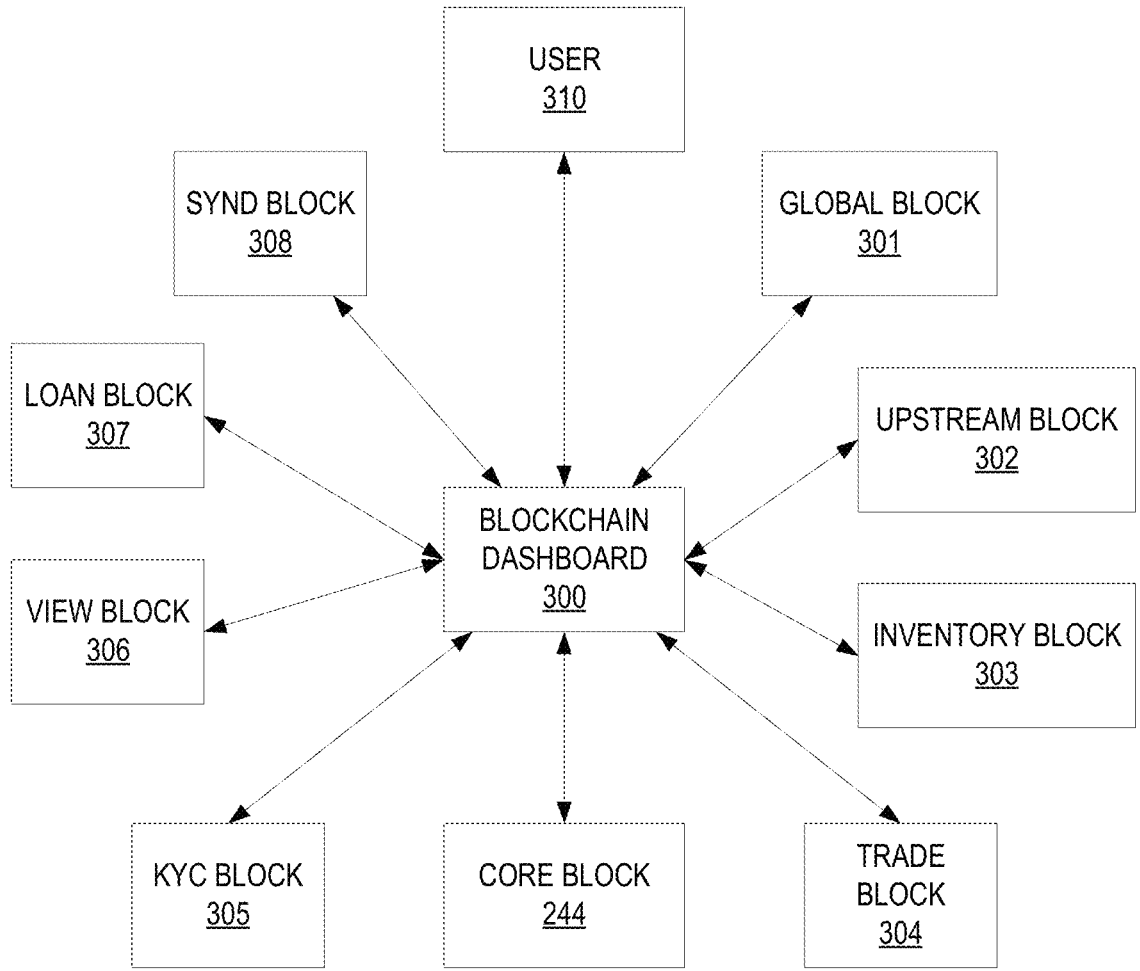

FIG. 3A presents a block diagram illustrating an overview of the blockchain dashboard in relation to the various decentralized applications used to facilitate resource transfers, in accordance with one embodiment of the present invention.

Figure 3B:
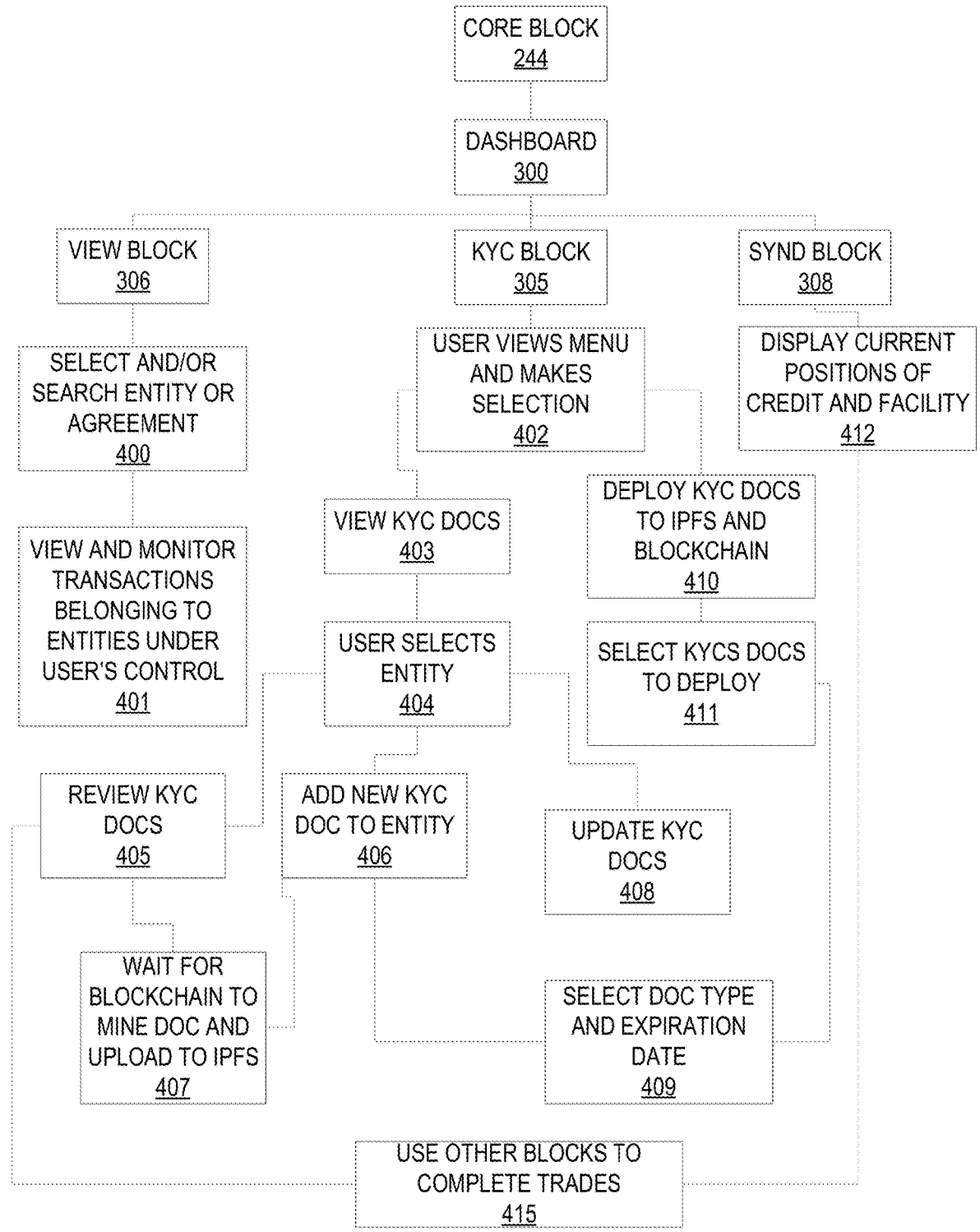
Figure 3C:
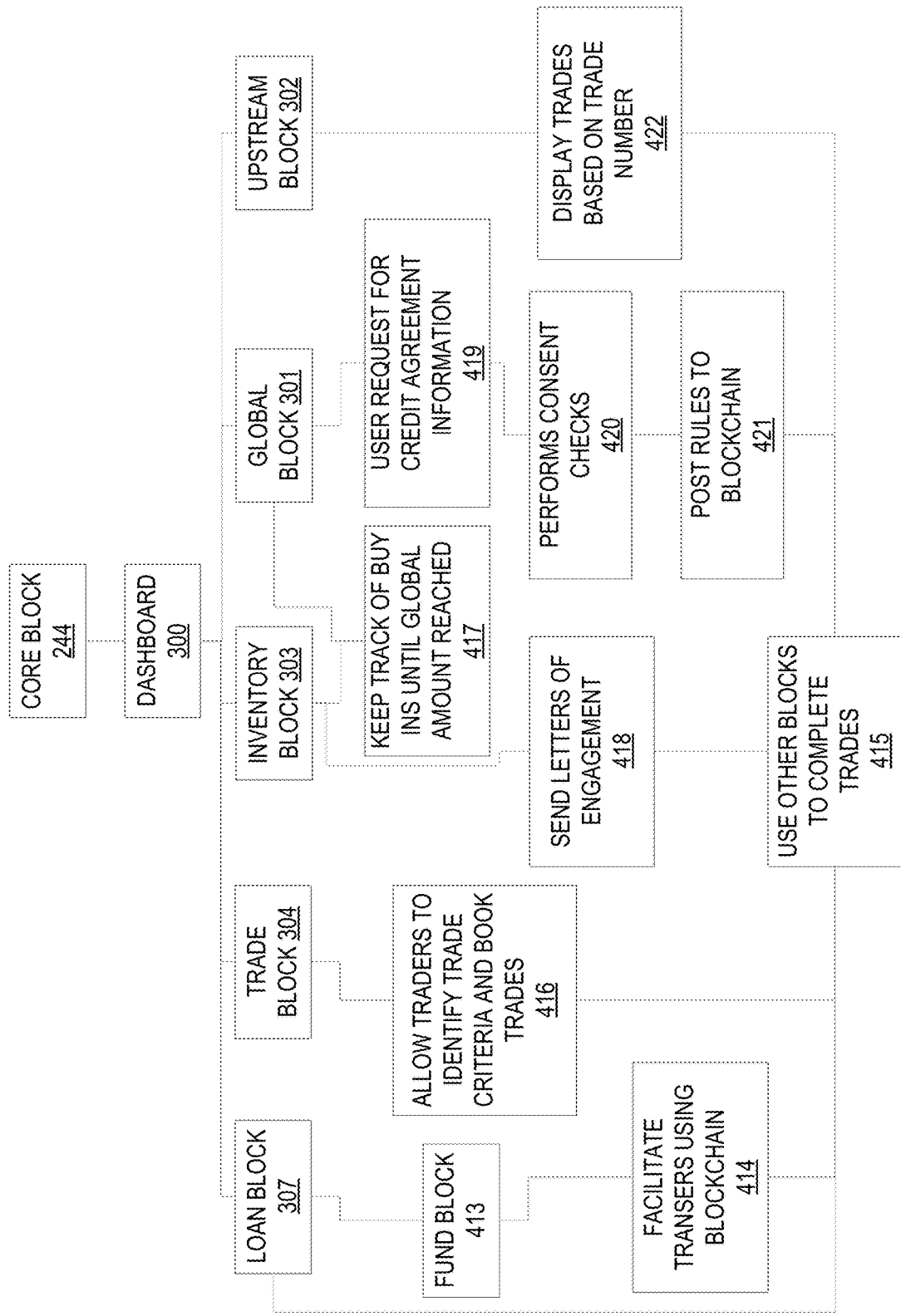

FIG. 3B and FIG. 3C present combination block and process flow diagrams illustrating the functions of the various decentralized applications in more detail, in accordance with one embodiment of the present invention.

Figure 4:
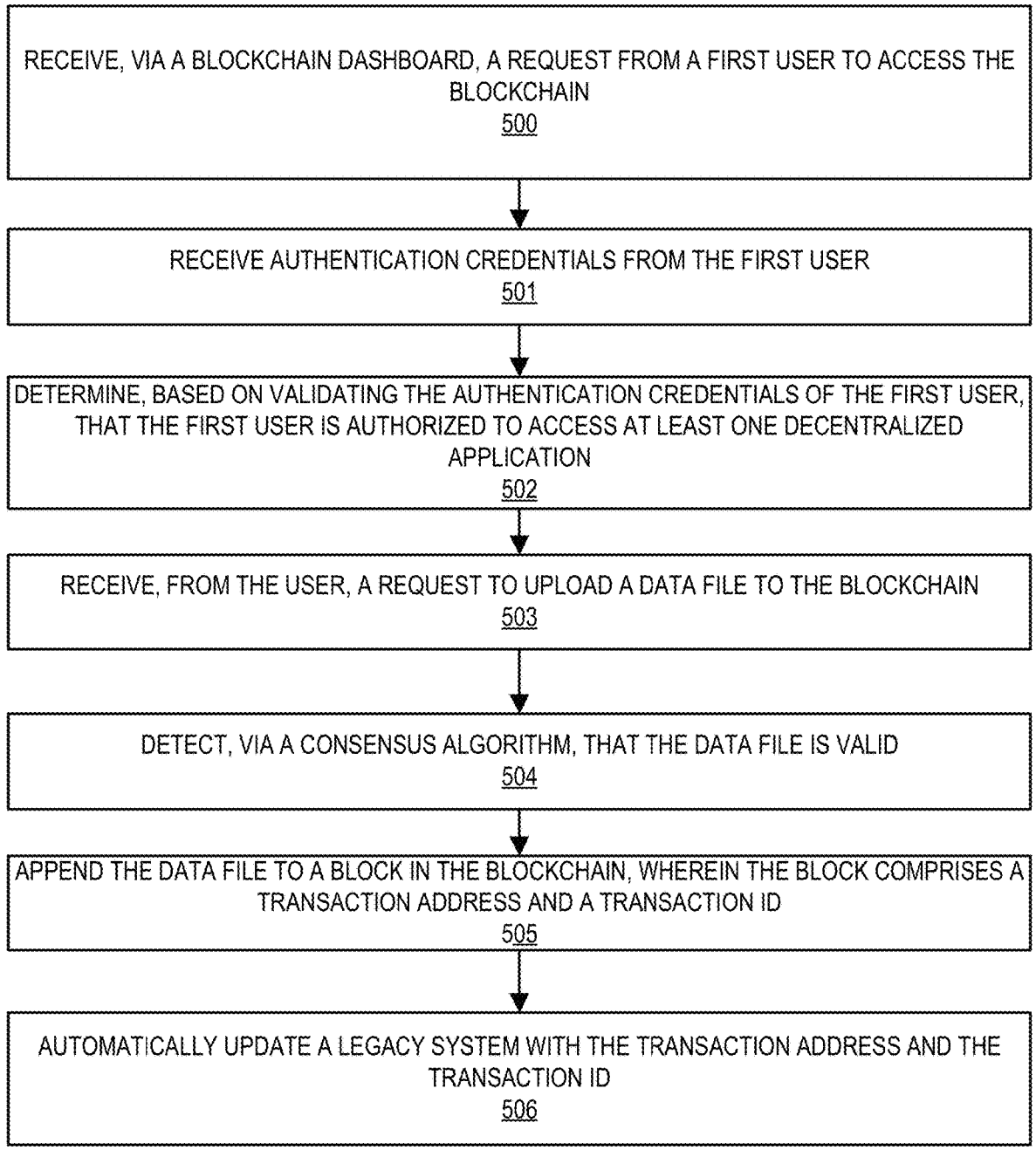

FIG. 4 illustrates a process flow for adding a data file to the blockchain and reconciling legacy systems, in accordance with one embodiment of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even if the phrase "one or more" is also used herein.

"Entity" as used herein may refer to an individual or an organization that owns and/or operates a system of networked computing devices and/or systems which interfaces with the blockchain through the decentralized applications. The entity may be a business organization, a non-profit organization, a government organization, and the like. The entity may be an organization which is involved in a resource transfer, and thus may be a party to the resource transfer or a facilitator of the resource transfer.

"User" as used herein may refer to an individual who may log onto the system to access the blockchain. Typically, the user may be required to be authorized and authenticated in order to access the system. Accordingly, in some embodiments, the user may be an employee of the entity, such as an administrator.

"Computing system" or "computing device" as used herein may refer to a networked computing device which may be owned and operated by an entity to access the permissioned blockchain or serve as the node on which the permissioned blockchain is implemented. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Data" or "data file" as used herein may refer to data associated with the resource transfer. In particular, the data or data file may contain information needed to complete the resource transfer.

"Resource" as used herein may refer to an object which may be owned by an entity and/or transferred between entities. Accordingly, "resource" may refer to tangible or intangible objects such as computing resources, data files, documents, funds, and the like.

"Blockchain" as used herein may refer to a distributed electronic ledger of data records which are authenticated by a consensus mechanism. Multiple computing systems within the blockchain, referred to herein as "nodes" or "compute nodes," each comprise a copy of the entire ledger of records. Accordingly, the entire record of transactions is not dependent on a single database which may serve as a single point of failure; the blockchain will persist so long as the nodes on the blockchain persist. Nodes may write a "block" to the blockchain, where the block may comprise transaction data and metadata, including a reference to the previous "block" in the chain. In some embodiments, "data record" or "transactional record" may refer to data associated with a resource transfer which is stored in a block on the blockchain. By linking blocks in this way, the blockchain contains a reliable history of all relevant records of data and resource transfers between entities. In some embodiments, the data may relate to a financial transaction. In other embodiments, the data may be files or records belonging to an individual or entity. The block may further comprise a time stamp and a pointer to the previous block in the chain, where the pointer may be a fix-length hash generated by a hash algorithm. In this way, the order of the blocks in history may be preserved. In the event that a node is compromised such that the blockchain data becomes corrupted, such as through hardware/software failure or a hacking attack, the remaining nodes hosting the blockchain may recognize that the blockchain data on the compromised node deviates from the accepted and validated version of the blockchain data stored on the remaining nodes. Thereafter, the remaining nodes may "drop" the compromised node from the blockchain and continue to maintain the verified version of the blockchain data. Alternatively, the compromised node may automatically replace the corrupted blockchain data with the verified blockchain data stored on the remaining uncompromised nodes.

A "private blockchain" or "permissioned blockchain" as used herein is a blockchain in which only authorized nodes may access the blockchain. In some embodiments, nodes must be authorized to write to the blockchain. In some embodiments, nodes must also be authorized to read from the blockchain. Typically, a user and/or computing system may submit a request to add a data record to the blockchain, upon which the data record is considered a pending data record until the pending data record is validated by a threshold number of validator nodes. In other embodiments, the private blockchain may append the pending data records without validation by miner nodes.

"Validator node" as used herein refers to a networked computing system that authenticates and verifies the integrity of pending transactions on the blockchain. The validator nodes typically validate pending data records using a "consensus mechanism," which may require that a pending transaction or data record is validated or approved by a threshold number of validator nodes. Once the threshold number of validator nodes has validated the transaction, the block becomes an authenticated part of the blockchain. By using this method of validating transactions, duplicate or erroneous transactions are prevented from becoming part of the accepted blockchain, thus reducing the risk of data record tampering and increasing the security of the transactions within the system. In some embodiments, the "consensus mechanism" may be a proof-of-work mechanism, which may require validator nodes to process a cryptographic puzzle in order to validate pending data records. In such embodiments, the validator node may be referred to as a "miner" node. In other embodiments, the consensus mechanism may be a proof-of-stake mechanism, through which the node to create the next block in the blockchain is selected based on the size of the stake of the participant.

Some embodiments of the invention may utilize asymmetric cryptography to secure the data records on the private blockchain. For instance, a data record may be encrypted with a first cryptographic key such that the record may only be decrypted using a corresponding second cryptographic key. In such an embodiment, a record encrypted using the second cryptographic key can likewise only be decrypted using the first cryptographic key. In this way, the system provides for a more secure way to prevent unauthorized access to sensitive information while selectively providing the records to the service providers who require them. In some embodiments, the method of asymmetric cryptography may comprise a private key and a public key corresponding to each other, such that data encrypted using the private key may only be decrypted using the public key, and vice versa. In some embodiments, the private key is configured to be used exclusively by a single individual or entity, while the public key may be distributed to one or more individuals or entities. In such an embodiment, data encrypted by the private key serves as an authenticated digital signature, such that recipients of the data may verify the identity of the sender of the data. On the other hand, data encrypted by the public key may only be decrypted by the holder of the private key—in such a case, the sender of the data may verify that the data may only be viewed by the intended recipient, i.e. the sole owner of the corresponding private key.

Embodiments of the present invention provide a comprehensive electronic system for integrating legacy systems with a blockchain using decentralized applications. In particular, the system may comprise a blockchain dashboard, which may be a decentralized application through which a user or entity may interact with the blockchain, which may include the ability to read data from the blockchain, write data to the blockchain, perform searches of historical data records within the blockchain, and the like. In some embodiments, the blockchain may be a permissioned blockchain. In other embodiments, the blockchain may be a public blockchain. Typically, the blockchain dashboard provides to the user a graphical interface through which the user may access a plurality of different distributed applications, where each distributed application interacts with the blockchain to provide a specific function and/or set of functions. The distributed applications may, for example, allow users and/or entities to upload documents associated with a resource transfer to the blockchain, and further access and read documents from the blockchain. Once a user submits a request to upload a document to the blockchain, the validator nodes may communicate with one another to reach a consensus on whether to validate the data record containing the document. Once a consensus has been reached, a data record containing the document is created and appended as an immutable part of the blockchain stored on each of the nodes. In this way, the all of the entities and/or parties involved in the resource transfer may assume the authenticity and validity of the data stored in the blockchain. Furthermore, the blockchain ensures that the version of the data records remains consistent across all of the parties to the resource transfer. In some embodiments, each entity may own and operate separate legacy systems (e.g. a legacy server) which stores the various types of data needed to complete the resource transfer. In such embodiments, the legacy system may be configured to automatically download and/or update data from the blockchain. In this way, the entity may retain the benefits of using the blockchain while continuing to utilize legacy systems without enacting a change in the entity's technology infrastructure. In other embodiments, the entity may host one or more nodes which participate in the maintenance of the permissioned blockchain. In such embodiments, the data records within the permissioned blockchain are encrypted such that the entity may access only those data records that correspond to the entity's private key, i.e. the entity will not be able to access data records which do not pertain to the resource transfers in which the entity is involved.

In a typical embodiment of the present invention, the resource transfer may be a loan settlement. Accordingly, the blockchain may be used to store the various financial records, loan settlement documents, "know your customer" ("KYC") documents, upstream trade documents, consent records, and other documents necessary to facilitate the loan settlement. Typically, the blockchain is permissioned such that only authorized entities (e.g. the parties and/or facilitators to the loan settlement) will be authorized to access the data records on the blockchain. The blockchain is typically further configured to encrypt the data records such that the parties, facilitators, and/or regulatory agents may access only the particular data records which relate to the loan settlement being facilitated or investigated. In one embodiment of the present invention, the parties to a loan settlement may store documents related to the loan settlement on their individual legacy servers. The parties may then access the blockchain dashboard to upload or retrieve documents, search historical records, verify transaction progress and/or status of outstanding items (e.g. signed consent documents), post and view trade information, receive notifications regarding action items, review documents and provide approvals, and the like. In this way, the distributed applications and the blockchain provide parties, facilitators, and regulators with a comprehensive, secure system to access all relevant data relating to a loan settlement or other types of resource transfers. By storing relevant documents within the blockchain, the parties are able to avoid the time-consuming and often rate-limiting steps of obtaining documents from various parties or correcting errors caused by inconsistent versions of documents; the data records on the blockchain serve as an immutable record of the entire transaction and may be relied upon to contain the verified, "true" versions of the documents necessary to complete the transaction. In some embodiments, the blockchain dashboard may be configured to provide particular users or entities with authorization to access specific decentralized apps while preventing access to others. In such embodiments, the blockchain dashboard may display only those applications to which the user is authorized to access while hiding the other applications.

The system as described herein addresses a number of technology-centric challenges over existing methods for facilitating resource transfers. In particular, storing resource transfer data and relevant documents on a blockchain provides a significantly higher level of resistance against data corruption and malicious modification of data. Furthermore, by providing for automatic reconciliation of data relating to the resource transfer, the system is able to prevent transaction errors caused by incorrect or invalid data while further removing the incidence of unnecessary duplication of data, which in turn improves the computing efficiency of the systems involved in performing and facilitating the resource transfer. Finally, by utilizing custom API's between the blockchain and the various entity legacy systems, the system is able to resolve the compatibility issues involved in integrating disparate systems.

The system further addresses many of the industry pain points experienced by participants when conducting electronic resource transfers, particularly in the areas of loan settlements and trade closings which lead to delays and increased trade settlement times. Having all relevant trade information and documents stored in the blockchain mitigates the chance of confusion around the terms and conditions associated with the assets being traded, which in turn greatly reduces settlement times. Furthermore, the system provides an expedient way to procure various required KYC documents as well as the required upstream documents when selling distressed credits, as well as verify delivery and receipt of such documents. The blockchain further provides a comprehensive and accurate way for traders to verify whether the opposing party is in fact in possession of the asset being sold. In this way, the invention provides the parties with a reliable and secure way to upload and view trade documents, verify trade information, verify receipt of documents and/or approvals by the other parties, utilize standardized fund transfer formats, and the like, which drastically increases the efficiency of trade settlements and avoids various industry pain points, such as settlement delays, industry confusion, costly fund transfer fees, delayed compensation, and the like.

FIG. 1 presents a permissioned blockchain environment for facilitating resource transfers, in accordance with one embodiment of the present invention. The blockchain environment typically comprises a plurality of nodes 110, each of which are connected to one another over a network, and each of which comprises a complete copy of the blockchain. The network may also be a global area network (GAN), such as the Internet, a wide area network (WAN), a local area network (LAN), or any other type of network or combination of networks. The network may provide for wireline, wireless, or a combination wireline and wireless communication between devices on the network. The nodes 110 maintain the blockchain and add new blocks to the blockchain via a consensus algorithm; that is, the addition of data records to the blockchain may occur only through consensus. Typically, consensus is reached when a threshold number of nodes 110 have voted to validate the pending data record. Once the pending data record has been validated, the pending data record may be appended to the blockchain and become a part of the immutable record. Each node 110 may thereafter update its copy of the blockchain accordingly to ensure consistency of records amongst the nodes 110.

In some embodiments, each entity associated with a resource transfer may host a node 110. In such embodiments, each entity may include a client system 101, 102, 103, 104 connected to a node 110. One or more of the client systems 101, 102, 103, 104 may be a legacy computing system which may not be specifically configured to interact with the blockchain itself. Rather, the legacy system may be connected to the blockchain via an API, through which the decentralized apps may read from and write to the legacy systems. Accordingly, the decentralized apps may be configured to "write back" transactional data from the blockchain to the client systems. In this way, the system seamlessly reconciles the data within the client systems using the data stored on the permissioned blockchain. In some embodiments, the blockchain dashboard may be installed as a client application on the client systems 101, 102, 103, 104. In other embodiments, the blockchain dashboard may be implemented on a web server 120 such that the dashboard is accessible through software such as a web browser. As should be recognized by one having ordinary skill in the art, although four client systems 101, 102, 103, 104 are depicted in FIG. 1, the system is fully capable of expanding to support additional client systems as needed.

The blockchain environment may further comprise a core block server 140, wherein the core block server 140 hosts the software and data comprising the protocols necessary to run the various distributed applications. The core block server 140 may further be operatively connected to an Email Server 130 which may allow the system to automatically send e-mails to the various parties to the resource transfer. For instance, an e-mail may be sent to a particular party if a certain document requiring the party's consent or approval has been uploaded to the blockchain. An e-mail may also be sent to notify parties of status changes to relevant resource transfers. Reminder e-mails may further be sent in the event that the system detects that a document requiring approval has yet to be approved by the relevant party. In some embodiments, the core block server 140 may further comprise the smart contracts required by the various decentralized applications to process resource transfers. The core block server 140 may further be operatively connected to a database 150 which may be used to store data associated with the entities who are utilizing the blockchain system. For instance, the database 150 may be used to store client and/or user information. Upon detecting that a user/client has authenticated with the system, the core block server 140 may access the database 150 to pull the user/client data and populate the dashboard with the user/client data.

In some embodiments, some of the nodes 110 may further be operatively connected to a plurality of blockchain piers 111, 112, 113. The blockchain piers may further facilitate communications and access to the blockchain to non-party entities. For instance, the system may be configured to provide selective access to certain blockchain data records to regulatory bodies and/or investigators. The system may be configured to provide regulators with a cryptographic key pertaining only to the resource transfers being audited. In this way, the system is able to provide selective access to the blockchain for certain entities without requiring said entities to operate a node 110 on the blockchain.

It should be understood by those having ordinary skill in the art that even if the various computing systems herein are depicted as single units, each of the depicted computing systems may represent multiple computing systems. In some embodiments, a given computing system may represent multiple systems configured to operate in a distributed fashion. In other embodiments, the functions of multiple computing systems may be accomplished by a single system.

FIG. 2 presents a block diagram 200 illustrating the client systems 101, nodes 110, and core block server 140 in more detail, in accordance with one embodiment of the present invention. The nodes 110 typically contain a processor 221 communicably coupled to such devices as a communication interface 211 and a memory 231. The processor 221, and other processors described herein, typically includes circuitry for implementing communication and/or logic functions of the blockchain and/or the distributed applications. For example, the processor 221 may include a digital signal processor device, a microprocessor device, and various analog to digital converters, digital to analog converters, and/or other support circuits. The data nodes 110 may use the communication interface 211 to communicate with other devices over the network 280. The communication interface 211 as used herein may include an Ethernet interface, an antenna coupled to a transceiver configured to operate on a cellular data, GPS, or WiFi signal, and/or a near field communication ("NFC") interface.

The nodes 110 may include a memory 231 operatively coupled to the processor 221. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The memory 231 within each node 110 may comprise a complete copy of the blockchain 241, wherein the blockchain 241 comprises a ledger of all transactions processed by the entities using the blockchain system. The blockchain 241 typically comprises blocks, which in turn comprise data records or transactional data. Each block comprises a header, which typically comprises a cryptographic hash. Each block further comprises a pointer to the header of the previous block in the chain. Each of the nodes 110 are configured to communicate with one another over the network 280. Once a pending data record is submitted to the blockchain 241, the nodes 110 may communicate with each other to reach a consensus as to the validity of the pending data record. Said data record may comprise transactional information or documents required to process a resource transfer (e.g. loan documents). Once a consensus has been reached, each node 110 may add the pending data record to the blockchain 241. The nodes 110 are typically configured to require users and computing systems to be authenticated to access any portion of the blockchain. Accordingly, the nodes 110 may be configured to accept various types of authentication credentials from a user, such as a username and password, secure token, cryptographic key, biometric data, and the like. The data records within the blockchain 241 may further be encrypted using a cryptographic key which is uniquely associated with a particular entity and/or transaction. The entity may be provided with a corresponding key that allows the entity to decrypt exclusively the data records which pertain to the entity. In this way, the system is able to support multiple entities and/or users while maintaining data security and privacy amongst the various entities and/or users.

The client system 101 may also comprise a processor 220 operatively connected to a communication interface 210 and a memory 230 having a client application 240 stored thereon. In some embodiments, the client application 240 may be an application provided by the owner of the blockchain system. In such embodiments, the client application 240 may comprise the blockchain dashboard which allows the user of the client system 101 to access the various decentralized applications that in turn allow the user to interact with the blockchain 241. The client application 240 may further be configured to access the core block server 140 to access the various protocols and smart contracts necessary for the decentralized applications to facilitate resource transfers. In other embodiments, the client application 240 may be another third party application such as a web browser, which allows the client system 101 to access a blockchain dashboard hosted on a web server. In such embodiments, the decentralized applications may be stored on the web server and/or other servers owned by the entity which operates the blockchain system.

The processor 220 may display a user interface 250 to a user, which may comprise the hardware and software implements to accept input from and provide output to the user. Accordingly, the user interface 250 may comprise hardware such as a display, audio output devices, projectors, and the like, or input devices such as keyboards, mice, motion sensors, cameras, biometric sensors, and the like. The user interface 250 may further comprise software such as a graphical or command-line interface through which the user may provide inputs and/or receive outputs from the client system 101. It should be understood that the display on which the user interface 250 is presented may include an integrated display (e.g. a tablet or smartphone screen) within the client system 101, or an external display device (e.g. a computer monitor or television).

The core block server 140 may also comprise a processor 224 operatively connected to a communication interface 214 and a memory 234 having a core block application 244 stored thereon. The core block application 244 may comprise the various protocols and smart contracts required by the decentralized applications to facilitate resource transfers. For instance, a smart contract may be deployed upon detecting that a user or client has accessed the blockchain system to approve a document uploaded on the blockchain, such as a trade settlement or related financial document. Such smart contracts may also include a smart contract which produces contract addresses associated with a transaction to send push notifications to certain parties which state that a particular document or transaction requires the party's approval. In some embodiments, the core block 140 is implemented on a cloud-based server such as a Microsoft Azure virtual server. Accordingly, the components of the core block server 140 may include an Azure VM with Windows Server 2012 r2, Linux Ubuntu server 16.04.1 LTS, Ethereum Blockchain, Geth Node, NodeJS, Mongodb, Meteor JS, Python, Javascript, Solidity, Smart Contracts, SQL Server 2015, SMTP Email IPFS (inter-planetary filing system) daemon and all required configuration libraries. In some embodiments, the core block 244 may, upon detecting that the client has authenticated with the blockchain system, pull the user's information and present to the user the decentralized applications to which the user is licensed and/or authorized to use through a blockchain dashboard.

FIG. 3A presents a block diagram illustrating a schematic of the blockchain dashboard 300 in relation to the various decentralized applications used to facilitate resource transfers, in accordance with one embodiment of the present invention. Typically, a user 310 accesses the blockchain dashboard 300, which may be deployed on the client system or located remotely on a webserver. The blockchain dashboard 300 may provide a graphical interface which enables the user to deploy and retrieve financial information and documents to and from the permissioned blockchain through the use of various decentralized applications. The various decentralized applications may be run as standalone modules or be integrated directly into any legacy infrastructure of trade parties to allow them to have instant access to all related trade information and/or documents, such as KYC documents, credit holdings, facility positions, upstream trade information, inventory positions and notice, and the like. The dashboard 300 may further be configured to allow the user 310 to view relevant trade information, trade documents, and the like. The dashboard 300 may further be configured to provide push notifications to the user 310, where the push notifications may include action items that require the user's 310 attention. For instance, push notifications may be displayed to the user if a particular trade document requires the user's 310 approval. Typically, the blockchain dashboard 300 is configured to require authentication credentials from authorized users 310. Accordingly, the blockchain dashboard 300 may require authentication credentials such as a username and password, legal entity name, e-mail address, and the like. In some embodiments, the dashboard 300 may further be configured with instant messaging and/or e-mail capabilities which allows trade partners to collaborate in real time as a trade or loan settlement progresses and relevant trade documents are added to the blockchain. The dashboard 300 may further feature dynamic news feeds to broadcast various items that may be of interest to the entities involved in the trading process.

In one embodiment, the dashboard 300 may present to the user a series of icons corresponding to each decentralized application to which the user is licensed and/or authorized to access. Each icon may comprise a subscript number which indicates actions or unresolved tasks that requires the user's attention. Once the user selects an icon with a subscript number, the dashboard may display the items which require the user's attention in list form. For instance, if a number of trades within the loan block 307 application require the user's approval, the trades will appear in a list to the user. The user may then be able to click the items in the list to reveal the details of the trades requiring the user's approval. The user may view the trade information and/or electronically sign the records, which may then trigger the posting of the electronic signature to the blockchain. In some embodiments, a PDF document of the electronic signature may be posted to the IPFS. The dashboard 300 may further assign a cryptographic key (e.g. a private key or public key) to the user along with a transaction address on the blockchain, which the user may use to access specific encrypted data records on the blockchain.

The blockchain dashboard 300 or "user block" may be configured to communicate with the various decentralized applications needed to provide the user 310 with access to the permissioned blockchain. In particular, the blockchain dashboard 300 may interface with the core block 244 application, which may be a cloud-based file system. The core block 244 comprises the protocols and smart contracts required by the various decentralized applications to execute their specific functions. For instance, the core block 244 may comprise blockchain-related protocols, libraries, database protocols, fileserver daemons, and the like. Typically, the dashboard 300 is a blockchain-based Web3 interface which allows trading partners to collaborate in real time to view and process financial transactions that are deployed on the blockchain. The dashboard 300 may grant access to the various decentralized applications as described herein, and further allow authorized users to view and approve any trade settlement or related financial document by calling the appropriate smart contract and processing the transaction on the blockchain. The dashboard 300 may further be configured to receive and process push notifications and display them on a graphical interface to instantly alert and allow users to process any trades or documents.

A variety of decentralized applications may read from the core block 244 to execute their functions. A description of a number of exemplary applications follows. The global block 301, for instance, may be an application which comprises data such as credit agreement information. In some embodiments, the global block 301 comprises Committee on Uniform Security Identification Procedures and other identifiers for the trade parties to access instantly via the blockchain. Summaries and positions may also be available for viewing. The global block 301 may be configured to verify that the credit agreement information is up to date and that credit transfer rules are not being violated.

The view block application 306 allows one or more users to selectively access data records within the blockchain which relate to the entities under their control. In an exemplary embodiment, the system may wish to provide selective blockchain access to a government regulator who is investigating a particular trade or transaction. The view block application 306 may, upon authenticating the regulator, allow the regulator to decrypt only those data records which are associated with the entities which the regulator is currently investigating. In some embodiments, the regulator may be required to provide their title; the system must verify that the regulator has the proper title to access a user's data streams. Typically, the users and/or clients are given the control to authorize regulators and/or managers to access the data records. Once the user authorizes the regulator, a verification is posted to the blockchain, which is thereafter referenced each time the regulator logs in to the system. The regulator may then, through the view block 306, access and view the data records pertaining to the investigation. In some embodiments, the view block 306 may further allow the regulator to submit comments which reference particular data records. In some embodiments, the comments may be added to the blockchain record. In other embodiments, the comments may be stored in a server separately, such that the comments do not become a part of the blockchain. Typically, the regulator may only be allowed to submit messages, comments, and inquiry requests to the owner of the contracts. The view block 306 will further allow electronic signoff and denial notices to be processed using the blockchain.

The KYC block 305 application is typically an application which manages documents relating to a transaction, such as the tax documents, certificates of corporation, administrative details, bank account information, legal documents, and/or the like, which are required during the electronic loan settlement and trade closings process. Such documents may be referred to herein as "KYC documents." The KYC block 305 allows the user 310 to upload KYC documents and information associated with funds they are managing. The KYC block 305 may be configured to instantly notify trading parties upon detecting that relevant KYC documents have been posted to the blockchain. The KYC block 305 may also notify trading parties when the KYC documents are required to be updated or uploaded to the blockchain. In this way, the KYC block 305 prevents the duplication of efforts involved in verifying KYC documents while also ensuring the integrity of the KYC documents uploaded to the blockchain as well as the IPFS. Accordingly, the KYC block 305 increases both the efficiency and security of the document verification, uploading, and retrieval processes. In some embodiments, the KYC block 305 may be dynamically integrated with the loan block 307 and/or any electronic trade settlement system.

The loan block 307 application may be configured to allow each user to process all loan settlement trade documents and deploy them to the blockchain. In particular, the loan block 307 may facilitate bank debt loan settlements by integrating its functions with those of the other decentralized applications as described herein. Typically, the loan block 307 may allow the user to deploy trade information and/or trade documents to the blockchain.

The upstream block 302 may be configured to allow the user 310 to view and track upstream trades relating to loan settlement. In particular, the upstream block 302 may allow distressed bank debt clients to load and track upstream trades. Thereafter, authorized users will be able to pull the upstream trades based on the credit agreement facility being traded. In some embodiments, the upstream block 302 may be run as a stand-alone application, in which parties may pull upstream tree data directly from the blockchain and supply purchase and sale agreements with the documented annex of trades from the blockchain and the IPFS of the core block server. In other embodiments, the upstream block 302 may be dynamically integrated with an electronic trading system to pull the upstream documents. In such embodiments, all related trade information and closing documents will be deployed to the blockchain. In an exemplary embodiment, the user 310 may use the upstream block 302 to access upstream trades and view various terms and conditions and/or trade closing documents related to the trades accessed by the user 310.

The inventory block 303 may dynamically track the status of an entity's credit assets. In particular. The inventory block 303 may provide a current proof of status of each entity's position in a given credit asset. When an entity adds or removes assets from the entity's inventory, the inventory block 303 may automatically be updated according to the actions taken by the entity. Accordingly, the inventory block 303 may also be configured to allow each entity to view the entity's current inventory status, which assists the entity in making buying or selling decisions. The inventory block 303 may further be integrated with the loan block 307 to drive trading processes in order to keep track of each trade and dynamically adjust an entity's inventory accordingly.

The trade block 304 application, or "trade matching block" application, may be configured to allow the user 310 to identify specific trade criteria for new trades and post trades to the blockchain for review by a counterparty. The trade block 304 may then be configured to accept a trade approval from the parties and post a record of the approvals to the blockchain. When both parties agree to the terms, the trade block 304 may allow trade approval and write the approval to the blockchain, which in turn will trigger the uploading of the approved trade booking to the loan block 307 and/or the parties' in-house databases. The other distributed applications as described herein may then read the trade data from the blockchain to further execute the trade. By utilizing the blockchain in this way, the trade block 304 ensures that the parties receive trusted and verified trade information, which mitigates inefficiencies caused by downstream term confusion.

A fund block application may facilitate the transfer of funds directly using the blockchain. Based on the remittance amount stated on a funding memo or purchase price letter, the fund block may post the remittance amount to a party's bank account based on the wire instructions and admin details. A smart contract may be created and deployed using the core block 244. In some embodiments, push notifications of the resource transfer may be sent to the notifications area of the dashboard 300.

The synd block 308 application may be configured to control the processing of new issue loans. By integrating with the loan block 307, the synd block 308 may send actual letters of engagement to solicit broker dealers, bank groups, fund Managers and financial institutions to see if they want to buy in to the credit being syndicated. Each party that wants to engage will buy into the credit by entering the commitment amount and approving the allocation letter. On approval, the core block 244 will deploy the buy-in records to the blockchain with the requested amount of the loan. The global block 301 may be used to keep track of the buy-ins until the global amount of the loan is reached. Thereafter, the loan block 307 may be updated and execute the loan closing as described herein.

FIG. 3B and FIG. 3C illustrate combination block and process flow diagrams which depicts the functions of the various decentralized applications in more detail, in accordance with one embodiment of the present invention. As seen in block 400, the view block 306 application may allow the user to choose and/or search for an entity or license agreement for which the user wishes to inspect. Typically, the user may be a regulator who has been tasked with investigating an entity and/or one or more transactions in which the entity is involved. The regulator may authenticate with the dashboard 300 to access the graphical interface, which may then allow the regulator to select an entity and/or transactions related to the entity. In some embodiments, the regulator may make selections using a drop-down menu. In other embodiments, the regulator may use an input field such as a text entry field to conduct a name search for an entity. Once the regulator has selected an entity and/or transaction, the process moves to block 401, where the user is able to view and monitor transactions belonging to the entity to which the user has been assigned.

The KYC block 305 application may comprise a KYC registry which performs KYC checks to provide real-time updates to the user. The registry may provide a historical record of all documents shared as well as compliance activities undertaken for each entity. Furthermore, the registry may ensure the integrity of KYC documents by ensuring that they have been verified and trusted. As seen in block 402, the user may view the menu bar within the dashboard 300 and select an entity, typically based on receiving a notification regarding a KYC document. Typically, the user selects an entity name or fund name from a drop down menu on the blockchain dashboard 300. In some embodiments, the user may wish to upload a KYC document to the blockchain and/or IPFS, as seen in block 410. In such embodiments, the process continues to block 411, where the user may then be prompted to locate a KYC document to be uploaded to the blockchain, where the KYC document may reside on an in-house file server, workstation, or other location. Once the user has selected a KYC document to upload, the KYC block 305 may receive the document and prepare it to be uploaded to the blockchain and/or the IPFS. In some embodiments, as seen in block 409, the user may be required to supply an expiration date or otherwise indicate that the document does not have an expiration date. In some embodiments, the KYC block 305 may be configured to check the uploaded KYC document for completeness and validity of the information therein. For instance, the KYC block 305 may check to ensure that all of the required fields have been filled before deploying the documents to the blockchain. Once the document has been verified, the process may proceed to block 406, where the KYC block 305 pushes the new KYC document to the blockchain. The process may then continue to block 407, where the blockchain miners perform validation on the document and append the document to the blockchain. Typically, the KYC block 305 may then file the document list on the IPFS with the transaction ID, which allows the KYC document to be retrieved for review, as seen in block 405. The KYC block 305 may further be configured to monitor expiration dates and push notifications to relevant parties to remind the parties of the expiration dates.

In some embodiments, the user may wish to view existing KYC documents on the blockchain. In such embodiments, the process begins at block 403, where the user makes a selection to view KYC documents. The process then proceeds to block 404, where the user selects an entity as described herein. Typically, the user selects an entity from a drop down list. In other embodiments, the user may input a custom entity name into a text entry field or the like. By using the transaction ID and transaction address, the user is able to retrieve existing KYC documents from the blockchain.

As seen in block 408, the user may select to update KYC documents that currently exist on the blockchain. Typically, this will require another block to be added to the blockchain, as existing blocks on the blockchain are generally immutable. In such embodiments, the block containing the updated KYC document may reference the transaction address of the previously uploaded KYC document.

The synd block 308 may, as seen in block 412, be configured to display a list of current positions for the credit and facility that is being sold by a particular entity. Typically, the synd block 308 may be configured to send engagement letters to broker dealers and the like to solicit buy-ins.

The loan block 307 may use all other decentralized applications to control loan settlement documents submitted to the core block 244 using a legacy electronic trading platform. The loan block 307, in some embodiments, may directly integrate into a third party electronic platform. In other embodiments, the loan block 307 may be a standalone application which accepts manually loaded loan settlement documents and processes the documents. The loan block 307 may be configured to accept direct electronic feeds from any electronic loan trading platform for bank debt settlement and notifications. The loan block 307 may deploy various documents needed to facilitate a trade closing, such as a trade confirmation, assignment agreement, funding memo, purchase price letter, purchase and sale agreement, multilateral agreement, bilateral netting agreement, consent letter, letter of credit, new issue commitment letter, and the like. Each trade line feed will be listed on the dashboard display grid along with a reference to the actual PDF document for review by the opposing counterparty. The system may then for execution/approval or rejection of the documents. Using the dashboard 300, the executed document will be deployed to the blockchain as approved or rejected. A new transaction address will be mined from the blockchain and stored in the IPFS, then subsequently written back to the user's legacy system along with an explicit notification of the action taken. At any time thereafter, the user may login to the dashboard 300 to view this transaction from the blockchain.

As described herein, the loan block 307 may interact with the other decentralized applications to carry out its functions. A number of exemplary embodiments are described in further detail below. In some embodiments, the dashboard 300 will be updated with the new transaction, and the icon subscript number may decrease by the amount of actions taken by the user to resolve outstanding action items. At any time, regulators using the view block 306 may login and check to ensure that the loan documents have been properly executed. As users are entering trades into the system, the KYC block 305 may verify the buyer and seller entity names and automatically return an indication that the KYC documents are up to date and available. If the KYC documents are not present, a push notification may be sent to the dashboard 300 where the client and the opposing counterparty may load their KYC documents and immediately continue to process the trade. The core block 244 may subsequently write back to legacy systems, and electronic notifications will be pushed to the dashboard and displayed in the proper sections when direct communication is required to facilitate the trade closing.

Additionally, depending on the trade, the global block 301 will verify that the credit agreement information is up to date and will check for the state of the facilities for pro-rata settlement and verify that credit transfer rules are not being violated. The global block 301 may notify the user that the credit they are trading has a reduction, paydown, or updated contacts. For distressed trades, the loan block 307 will poll the upstream block 302 and pull in the related upstream annex to each trade based on the credit agreement. The upstream block 302 may then supply the contract address of the upstream trade list. The trade parties can then indicate that the upstream trade documents are available and can be accessed via the dashboard 300. The trade block 304 may be configured to verify that the counterparties have been supplied with the correct information for the trade. As a result, the terms and conditions will have already been approved on the front end, and thus will not be rejected downstream because of human error. Each trade, when closed, will be funded via approval from the proper personnel. The fund block 413, as seen in block 414, may publish the remittance amount directly to the blockchain. The funding amount will be 100% accurate due to the global block 301 supplying real-time updates on the positions of the global amounts the revised commitments. Once the loan block 307 executes and deploys a funding memo, the core block 244 may mine the transaction and send payment notifications to the bank for bank transfer to be executed via a smart contract. Push notifications may be sent via the dashboard 300 when the transactions are completed. Additionally, the inventory block 303 may keep track of the asset position and control the sale of facilities to prevent the trade from selling short. The inventory block 303 may interact with the global block 301 to prevent the user from violating the minimum hold amount based on the balance of the allocations for each buy in that asset. This will help increase closing speeds because trade will not be flagged as trading short as a result of the seller not having ownership of the position being sold.

The global block 301 may control credit agreement information and/or trade information. Each credit agreement may comprise a summary that supplies loan settlement systems with instant access to loan requirements. As seen in block 419, the global block 301 may receive a user request for credit agreement information. The process may then continue to block 420, where the global block 301 performs various checks and verifications. The global block 301 may be configured to verify minimum transfer amounts, minimum hold amounts, facilities fees, assignment fees, pro-rata status, applicable margin calculations, commitment fees, fronting fees, whether consents are required, various restrictions, start date and repricing date of contracts, margin, RAC rate, all-in rate, CUSIP and deal identifiers, legal names, contract data, and the like. Once the checks have been performed, the credit agreement information and/or loan requirements and rules may be made available on the blockchain, as indicated in block 421. Each trade entered into the loan block 307 may dynamically access the global block 301, where the trade specifics may be adjusted during entry of the trade. The global block 301 check for reductions of any facility against every open trade in the loan block system 307 and send instant notifications of the reductions to the dashboard 300. This may in turn trigger the blockchain to redeploy the revised commitment amounts and create a new transaction address for the commitment update. Each client having open trades in the loan block 307 or a legacy system will be instantly notified of the commitment reduction.

The upstream block 302, like the other decentralized applications, may be operated in either a standalone mode or be integrated with other applications. As seen in block 422, the upstream block 302 may be configured to display all trades and trading documents connected to a particular trade based off of the trade number. In some embodiments, the upstream block 302 may be integrated with the loan block 307. In such embodiments, each distressed trade loaded on the blockchain will have a unique transaction address, which may be associated with the related credit agreement information and the transaction address of the facility previously deployed to the blockchain. The core block 244 may capture and maintain the transaction addresses for each trade deployed from the loan block to maintain the dynamic link for all transaction addresses for each upstream trade, credit agreement, and facility. A downstream trade may reference the upstream dynamic link and be deployed to the blockchain along with a new transaction address.

Each transaction address originally created by the loan block 307 will be stored to the upstream tree. As a result, a comprehensive tree view of the upstream tree may be constructed and displayed to the user to be inserted into other documents, such as a purchase and sale agreement. Such upstream documents may be stored on the IPFS and may be accessed by parties and/or their representatives. In some embodiments, all transactions may be mined and stored in the blockchain using the core block 244. The global block 301 may be configured to call smart contracts from the core block 244 to pull the upstream tree on demand. Any entity permissioned to the trade and authorized to access the dashboard 300 may pull the upstream trades from the blockchain and view or download the upstream relationship tree for the PSA annex. In some embodiments, the upstream block 302 can be accessed directly from the dashboard 300. Entities or counsel who are permissioned to the credit agreement and are also a party to the trade may manually update the upstream data for the current trade being processed. The user may obtain the original PDF trade documents and attach them to the upstream block 302, and when finished with the upstream link, the user may deploy the upstream tree to the blockchain. The attached PDF documents may be stored on the IPFS, and the core block 244 may mine each transaction and return the transaction address to the upstream block 302. Each trade that is closed may be stored in the blockchain with the buyer, seller and credit information with the allocated amounts for each facility supplied from the loan block 307. The global block 301 may control and supply all instances and requests from the entities that are permissioned to view the credit data from the upstream block 302; any approved participant will be able to pull the upstream trades based on the credit agreement facility being traded.

The trade block 304, as seen in block 416, may be configured to allow traders to identify all of the specific trade criteria for new trades, then book the trade in an electronic form. The trade may then be deployed to the blockchain for review by the counterparty trader. Typically, traders log into the dashboard 300, through which the user may enter trade criteria. The trade block 304 may be configured to supply credit agreement information and prevent the user from making errors, such as incorrect transfer amounts, and the like. The trade block 304 may also provide a summary sheet of credit pricing specifications to assist the user in making a proper deal. The user may then deploy a trade booking to the blockchain, where the trade booking is based on the trade criteria. Once the core block 244 mines the transaction and generates a transaction address, the address may be provided to the counter-party trader such that the counter-party trader may log into the dashboard 300 to view and/or approve or reject the trade booking. When both sides assent to the trade booking (e.g. via an electronic signature), a smart contract may instruct the core block 244 to mine a transaction representing the mutual assent and automatically post the trade to the loan block 307, and thereafter push a notification to the dashboards of the entities' closers, which states that a new trade has been posted.

The fund block 413 may allow trading entities to make bank-to-bank transfers and payments when the trade is settled. The fund block 413 may be accessed during the loan block 307 trade closing procedure. Once the buyer and seller agree on the funding memo terms and remittance amounts and/or the purchase price letter, the fund block 413 may call a smart contract to complete the transfer of funds to the seller's account. The core block 244 may then mine and deploy a transactional record to the blockchain and assign a transaction address, which may be used to store the actual funding memo PDF document to the IPFS. Said transaction address may be passed to the loan block 307 to obtain the administration details based on the transaction address generated from the KYC block 305. Once all of the trade information is processed and verified, the fund block 413 may call the final smart contract to make the fund transfer to the buyer's bank account. The dashboard's 300 push notifications for closed trades may be updated and all parties may be automatically notified.

Finally, it should be noted that all of the decentralized applications, with the exception of the view block 306, may integrate with and/or utilize the other decentralized applications to complete trades, as indicated in block 415. It should further be noted that although the various decentralized applications are depicted as separate applications in some embodiments, one skilled in the art would recognize that in other embodiments, the functions of the various decentralized applications may be accomplished in a single application.

FIG. 4 illustrates a process flow for adding a data file to the blockchain and reconciling legacy systems, in accordance with one embodiment of the present invention. The process begins at block 500, where the system receives, via a blockchain dashboard, a request from a first user to access the blockchain. The user may be an individual associated with an entity, such as an employee of an entity who is involved in a resource transfer or transaction. In other embodiments, the user may be an individual representing a regulatory agency who has been tasked with investigating a certain transaction or transactions. In some embodiments, the user accesses a blockchain dashboard application to request access to the blockchain, where the blockchain is typically a permissioned blockchain. The blockchain dashboard application may be an application installed on the user's client system, which may then be executed by the user. In other embodiments, the blockchain application may be a remote application stored on a webserver owned and operated by a separate entity. In such embodiments, the user may access the blockchain application through, for example, a web browser or the like. Through the blockchain dashboard, the user is able to execute various functions on the blockchain. For instance, the system may be configured to allow the user to upload data files or documents to the blockchain. In other embodiments, the system may be configured to allow the user to view certain data records on the blockchain using a cryptographic key which is uniquely associated with the data records to which the user is authorized to access.

The process continues to block 501, where the system receives authentication credentials from the first user. Typically, the system assigns unique authentication credentials to each authorized user. The system may be configured to accept various types of authentication credentials from the user, such as a username and password, cryptographic key, secure token, biometric data, and the like. Based on the user's identity, the system may be configured to restrict access to certain functions of the blockchain system. For instance, the blockchain dashboard may be configured to restrict certain users from uploading documents to the system. In an exemplary embodiment, the user may be an investigative regulator who only requires "read" access of specific data records within the blockchain, i.e. the data records pertaining to the transaction being investigated. In such an embodiment, the blockchain dashboard may restrict access to certain decentralized applications, or alternatively, may prevent certain decentralized applications (e.g. the applications which allow users to write data to the blockchain) from being displayed to the user based on the user's status. Furthermore, the regulator may be provided with a cryptographic key that corresponds only to the data records to which the regulator is permitted access. By using the unique cryptographic key, which is known only to the regulator and the party being investigated, the regulator may decrypt the encrypted data records which pertain to the transactions under investigation.

The process continues to block 502, where the system determines, based on validating the authentication credentials of the first user, that the first user is authorized to access at least one decentralized application. Typically, the number of decentralized applications to which the user has access depends on the status of the user. For instance, an employee or administrator of an entity involved in a trade or transaction may be provided access to the entire suite of decentralized applications within the blockchain system, which may provide read and write capabilities from and to the blockchain. On the other hand, a regulator or other third party may be restricted to only those decentralized applications which provide selective viewing capabilities only, in order to preserve the confidential information of the entities entering into transactions using the blockchain. The blockchain dashboard may be configured to populate a graphical interface with the applications and/or functions available to the user. Said graphical interface may provide various viewing windows and/or input fields (e.g. drop down menus, text entry boxes, selectable buttons, and the like). In some embodiments, the blockchain dashboard may access relevant data records on the blockchain to be displayed to the user, such as various types of trade information and the current status of documents needed to complete the transaction. For instance, the system may be able to detect whether a certain required KYC document has been uploaded to the system. The system may, upon detecting that the required KYC document resides at a particular transaction address, may automatically populate the graphical interface using the data found within the KYC document. In some embodiments, the transaction address may be a cryptographic hash, such as a 256-bit hash. In this way, the dashboard provides an instantaneous and reliable method of verifying the submission of the document to the blockchain system. This in turn prevents the need for the user to conduct a time and resource-intensive search to obtain the required documents and/or data to move forward with the transaction.

Based on the user's status, the blockchain dashboard may further comprise a notifications area through which the system may push relevant notifications to the user. For instance, the system may determine that there are one or more action items which require the user's attention. Such action items may include a document that requires the user approve and/or sign. Another type of action item may be a request to upload a certain document or provide certain information, such as a KYC document. In some embodiments, the system may further push notifications of various status updates related to a transaction. For example, the system may determine that a user is associated with a particular transaction. Thereafter, the system may push status updates regarding the particular transaction to the user's dashboard, such as when an opposing party has assented to trade terms, uploaded documents, approved documents, and the like. Each notification may further comprise an interactive link to the action item in question, such that the user may directly address the action item through the interactive link (e.g. the interactive link opens a window to allow the user to upload a document). In some embodiments, the user may elect to provide transactional information through the use of forms. In such embodiments, the system may be configured to read from the blockchain to automatically populate the fields within the form based on the user's identity and/or status.

The process continues to block 503, where the system receives, from the user, a request to upload a data file to the blockchain. In an exemplary embodiment, the data file may be a document, such as a KYC document or trade document, which is needed to process a resource transfer (e.g. a loan settlement). Typically, the data file is a file located on a computing system within the entity. In some embodiments, the data file may be stored on the client system (e.g. the user's workstation). In other embodiments, the data file may be stored on a legacy server within the entity. The graphical interface may provide an input field, such as a drop down menu, that allows the user to indicate the type of data file to be uploaded to the blockchain. Upon receiving a selection of a data file type, the system may prompt the user to upload the data file to the blockchain system. In some embodiments, the blockchain dashboard may display a form to the user via the graphical interface, where the form comprises various input fields which correspond to the information needed to process the transaction. In some embodiments, the blockchain dashboard may pull information from previous data records and/or the uploaded data file to automatically populate the fields.

The process continues to block 504, where the system detects, via a consensus algorithm, that the data file is valid. To ensure the integrity and validity of the data within the blockchain, the system must use a method of achieving consensus amongst the nodes on which block should follow the previous block in the blockchain. In a typical embodiment of the invention, the consensus mechanism used by the nodes is a proof-of-work mechanism, which may require that the nodes solve a cryptographic puzzle (i.e. show proof of work), such as calculating an input into a cryptographic hash algorithm which produces a hash that falls within a predetermined range of values. For instance, the consensus mechanism may require that the cryptographic hash produced by the node's inputs falls below a certain threshold value. In such embodiments, the nodes performing the work may be referred to as "miner nodes" or "miners," and the act of performing the computations needed to validate the uploaded data files may be referred to as "mining." Accordingly, the nodes may "mine" the transaction to validate the data file uploaded by the user. Once the mining has been successfully completed, the first miner to complete the mining may propagate a proposed state of the blockchain to the other nodes in the system. Thereafter, the data file is considered to be validated, and may be appended to the blockchain in a data record by each node within the blockchain system, such that the nodes come to a consensus on the "true" and verified sequences of blocks within the blockchain. In alternative embodiments, the consensus mechanism used may be a proof-of-stake mechanism. In yet other embodiments, the consensus mechanism used may be a Byzantine fault tolerance (BFT) algorithm.

The process continues to block 505, where the system appends the data file to a block in the blockchain, wherein the block comprises a transaction address and a transaction ID. At this stage, a new block is added to the blockchain. Typically, the new block comprises a header (in some embodiments, a transaction address), which may in some embodiments be a fixed-length hash. The new block may also comprise a pointer to the header of the previous block in the blockchain. A transaction ID may further be stored along with the data file in the block, where the transaction ID identifies the data file as being related to a particular transaction. In this way, the system is able to reference the blockchain to identify the data files and/or information associated with a particular transaction by referencing the transaction ID, and identify the exact location within the blockchain by using the transaction address. Typically, the data records within a block are immutable and may not be readily modified once the block becomes part of the blockchain; the system may only add subsequent blocks to the blockchain. In this way, the system may have a high level of confidence that a document or information stored on the blockchain represents the original, unmodified version as intended by the uploading user/entity.

Finally, the process concludes at block 506, where the system automatically updates a legacy system with the transaction address and the transaction ID. This function may be referred to herein as a "write back" or "writing back" function. In some embodiments, the legacy system may be a server, which may for instance host a SQL database, which is used by an entity to process transactions and resource transfers using traditional methods (i.e. non-blockchain methods). The core block 244 may be configured to communicate with such legacy servers via an API, which allows for two-way communication between the legacy systems and the blockchain. The nodes, upon detecting that the data file has been added to the blockchain, may automatically update the database within the legacy server to reflect that the data file has been added to the blockchain. In particular, the system may update the database by adding the blockchain transaction address as well as the transaction ID. In this way, the blockchain system seamlessly performs reconciliation of legacy servers with the data and/or information contained on the blockchain. This in turn prevents the legacy servers from hosting outdated or invalid versions of the data and/or information related to various transactions, while simultaneously ensuring that the legacy servers may continue to operate with minimal disruption to established workflows.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for integrating legacy systems with a blockchain, comprising:
  a communication interface;
  a processor; and
  a memory having a blockchain application stored thereon, wherein the blockchain application, when executed by the processor, causes the processor to:
    receive, via a blockchain dashboard, a request from a first user to access the blockchain;
    receive authentication credentials from the first user;
    determine, based on validating the authentication credentials of the first user, that the first user is authorized to access a first decentralized application;
    detect one or more action items associated with the first user, wherein the one or more action items comprises a request for a data file from the first user;
    based on detecting the one or more action items associated with the first user, transmit, through the blockchain dashboard, a notification to the first user, wherein the notification comprises an interactive link that, when activated on a user device associated with the first user, opens a window within the blockchain dashboard on the user device, wherein the window is configured to allow the first user to upload the data file to the blockchain;
    receive, from the user through the interactive link, a request to upload the data file to the blockchain, wherein the data file is a document file associated with a first transaction;
    detect, via a consensus algorithm, that the data file is valid;
    encrypt the data file using a cryptographic public key associated with the first user;
    append the data file to a block in the blockchain, wherein the block comprises a transaction address and a transaction ID, wherein the transaction address and the transaction ID identify a location of the data file within the blockchain;
    automatically update, through an application programming interface, a legacy system by appending the transaction address and the transaction ID to a legacy database within the legacy system, wherein the application programming interface enables two-way communication between the legacy system and the blockchain through the first decentralized application;
    provide, using a blockchain pier associated with the first user, selective access to the data file to the first user;
    based on updating the legacy system, automatically display, on the blockchain dashboard, the document file associated with the transaction address and the transaction ID by retrieving the data file from the blockchain using the transaction address and the transaction ID, wherein displaying the document file further comprises decrypting the data file using a cryptographic private key associated with the first user;
    detect that a second user has uploaded a second data file to the blockchain, wherein the second data file is associated with the first transaction;
    determine that the second data file requires an approval of the second data file from the first user;

based on detecting the second data file, transmit, by executing a smart contract stored within the blockchain, a second notification to the first user, wherein the second notification comprises a status update associated with the first transaction, wherein the status update indicates that the second data file has been uploaded to the blockchain, wherein the second notification further comprises a second interactive link that, when activated on the user device associated with the first user, opens a second window within the blockchain dashboard on the user device, wherein the second window is configured to allow the first user to submit an approval of the second data file.

2. The system according to claim 1, wherein the blockchain application further causes the processor to:
detect a status of the first user;
in response to detecting the status of the first user, determine that the first user is authorized to access a first set of decentralized applications; and
display, via the blockchain dashboard, the first set of decentralized applications on a graphical interface.

3. The system according to claim 1, wherein the blockchain application further causes the processor to:
detect a status of a third user;
in response to detecting the status of the third user, determine that the third user is restricted from accessing the first decentralized application; and
display, via the blockchain dashboard, a second set of decentralized applications on a graphical interface, wherein the second set of decentralized applications excludes the first decentralized application.

4. The system according to claim 1, wherein the blockchain application further causes the processor to:
receive, from the second user, a request to view a set of encrypted data records on the blockchain;
receive authentication credentials from the second user, wherein the authentication credentials comprises a cryptographic key;
determine, based on validating the authentication credentials of the second user, that the second user is authorized to access the set of encrypted data records; and
decrypt the set of encrypted data records using the cryptographic key.

5. The system according to claim 1, wherein the blockchain application further causes the processor to:
detect that a status of the first transaction has been changed; and
display, via a graphical interface, a second notification to the first user through the blockchain dashboard.

6. The system according to claim 1, wherein the blockchain application, when executed by the processor, further causes the processor to:
detect, through a smart contract, that the data file has been appended to the blockchain;
based on detecting that the data file has been appended to the blockchain, transmit a second push notification to the second user using the smart contract, wherein the second push notification comprises a second interactive link that, when activated on a second user device associated with the second user, opens a second window within a blockchain dashboard on the second user device, wherein the second window is configured to allow the second user to submit an approval of the data file from the second user by electronically signing the data file;
receive, from the second user through the second interactive link, an electronic signature associated with the data file;
append a record of the electronic signature to the blockchain; and
provide, using a blockchain pier associated with the second user, selective access to the data file to the second user.

7. A computer program product for integrating legacy systems with a blockchain, the computer program product comprising at least one non-transitory computer readable medium having computer-readable program code portions embodied therein, the computer-readable program code portions comprising:
an executable portion for receiving, via a blockchain dashboard, a request from a first user to access the blockchain;
an executable portion for receiving authentication credentials from the first user;
an executable portion for determining, based on validating the authentication credentials of the first user, that the first user is authorized to access a first decentralized application;
an executable portion for detecting one or more action items associated with the first user, wherein the one or more action items comprises a request for a data file from the first user;
an executable portion for, based on detecting the one or more action items associated with the first user, transmitting, through the blockchain dashboard, a notification to the first user, wherein the notification comprises an interactive link that, when activated on a user device associated with the first user, opens a window within the blockchain dashboard on the user device, wherein the window is configured to allow the first user to upload a data file to the blockchain;
an executable portion for receiving, from the user through the interactive link, a request to upload the data file to the blockchain, wherein the data file is a document file associated with a first transaction;
an executable portion for detecting, via a consensus algorithm, that the data file is valid;
an executable portion for encrypting the data file using a cryptographic public key associated with the first user;
an executable portion for appending the data file to a block in the blockchain, wherein the block comprises a transaction address and a transaction ID, wherein the transaction address and the transaction ID identify a location of the data file within the blockchain;
an executable portion for automatically updating, through an application programming interface, a legacy system by appending the transaction address and the transaction ID to a legacy database within the legacy system, wherein the application programming interface enables two-way communication between the legacy system and the blockchain through the first decentralized application;
an executable portion for providing, using a blockchain pier associated with the first user, selective access to the data file to the first user;
an executable portion for, based on updating the legacy system, automatically displaying, on the blockchain dashboard, the document file associated with the transaction address and the transaction ID by retrieving the data file from the blockchain using the transaction address and the transaction ID, wherein displaying the document file further comprises decrypting the data file using a cryptographic private key associated with the first user;

an executable portion for detecting that a second user has uploaded a second data file to the blockchain, wherein the second data file is associated with the first transaction;

an executable portion for determining that the second data file requires an approval of the second data file from the first user;

an executable portion for, based on detecting the second data file, transmitting, by executing a smart contract stored within the blockchain, a second notification to the first user, wherein the second notification comprises a status update associated with the first transaction, wherein the status update indicates that the second data file has been uploaded to the blockchain, wherein the second notification further comprises a second interactive link that, when activated on the user device associated with the first user, opens a second window within the blockchain dashboard on the user device, wherein the second window is configured to allow the first user to submit an approval of the second data file.

8. The computer program product according to claim 7, the computer-readable program code portions further comprising:

an executable portion for detecting a status of the first user;

an executable portion for, in response to detecting the status of the first user, determining that the first user is authorized to access a first set of decentralized applications;

an executable portion for displaying, via the blockchain dashboard, the first set of decentralized applications on a graphical interface.

9. The computer program product according to claim 7, the computer-readable program code portions further comprising:

an executable portion for detecting a status of a third user;

an executable portion for, in response to detecting the status of the third user, determining that the third user is restricted from accessing the first decentralized application;

an executable portion for displaying, via the blockchain dashboard, a second set of decentralized applications on a graphical interface, wherein the second set of decentralized applications excludes the first decentralized application.

10. The computer program product according to claim 7, the computer-readable program code portions further comprising:

an executable portion for receiving, from the second user, a request to view a set of encrypted data records on the blockchain;

an executable portion for receiving authentication credentials from the second user, wherein the authentication credentials comprises a cryptographic key;

an executable portion for determining, based on validating the authentication credentials of the second user, that the second user is authorized to access the set of encrypted data records; and an executable portion for decrypting the set of encrypted data records using the cryptographic key.

11. The computer program product according to claim 7, the computer-readable program code portions further comprising:

an executable portion for detecting that a status of the first transaction has been changed; and an executable portion for displaying, via a graphical interface, a second notification to the first user through the blockchain dashboard.

12. The computer program product according to claim 7, the computer-readable program code portions further comprising:

an executable portion for detecting, through a smart contract, that the data file has been appended to the blockchain;

an executable portion for, transmitting a second push notification to the second user using the smart contract, wherein the second push notification comprises a second interactive link that, when activated on a second user device associated with the second user, opens a second window within a blockchain dashboard on the second user device, wherein the second window is configured to allow the second user to submit an approval of the data file from the second user by electronically signing the data file;

an executable portion for receiving, from the second user through the second interactive link, an electronic signature associated with the data file;

an executable portion for appending a record of the electronic signature to the blockchain; and an executable portion for providing, using a blockchain pier associated with the second user, selective access to the data file to the second user.

13. A computer-implemented method for integrating legacy systems with a blockchain, the method comprising:

receiving, via a blockchain dashboard, a request from a first user to access the blockchain;

receiving authentication credentials from the first user;

determining, based on validating the authentication credentials of the first user, that the first user is authorized to access a first decentralized application;

detecting one or more action items associated with the first user, wherein the one or more action items comprises a request for a data file from the first user;

based on detecting the one or more action items associated with the first user, transmitting, through the blockchain dashboard, a notification to the first user, wherein the notification comprises an interactive link that, when activated on a user device associated with the first user, opens a window within the blockchain dashboard on the user device, wherein the window is configured to allow the first user to upload a data file to the blockchain;

receiving, from the user through the interactive link, a request to upload the data file to the blockchain, wherein the data file is a document file associated with a first transaction;

detecting, via a consensus algorithm, that the data file is valid;

encrypting the data file using a cryptographic public key associated with the first user;

appending the data file to a block in the blockchain, wherein the block comprises a transaction address and a transaction ID, wherein the transaction address and the transaction ID identify a location of the data file within the blockchain;

automatically updating, through an application programming interface, a legacy system by appending the transaction address and the transaction ID to a legacy database within the legacy system, wherein the application programming interface enables two-way communication between the legacy system and the blockchain through the first decentralized application;

providing, using a blockchain pier associated with the first user, selective access to the data file to the first user;

based on updating the legacy system, automatically displaying, on the blockchain dashboard, the document file associated with the transaction address and the transaction ID by retrieving the data file from the blockchain using the transaction address and the transaction ID, wherein displaying the document file further comprises decrypting the data file using a cryptographic private key associated with the first user;

detecting that a second user has uploaded a second data file to the blockchain, wherein the second data file is associated with the first transaction;

determining that the second data file requires an approval of the second data file from the first user;

based on detecting the second data file, transmitting, by executing a smart contract stored within the blockchain, a second notification to the first user, wherein the second notification comprises a status update associated with the first transaction, wherein the status update indicates that the second data file has been uploaded to the blockchain, wherein the second notification further comprises a second interactive link that, when activated on the user device associated with the first user, opens a second window within the blockchain dashboard on the user device, wherein the second window is configured to allow the first user to submit an approval of the second data file.

14. The computer-implemented method of claim 13, the method further comprising:
detecting a status of the first user;
in response to detecting the status of the first user, determining that the first user is authorized to access a first set of decentralized applications;
displaying, via the blockchain dashboard, the first set of decentralized applications on a graphical interface.

15. The computer-implemented method of claim 13, the method further comprising:
detecting a status of a third user;
in response to detecting the status of the third user, determining that the third user is restricted from accessing the first decentralized application;
displaying, via the blockchain dashboard, a second set of decentralized applications on a graphical interface, wherein the second set of decentralized applications excludes the first decentralized application.

16. The computer-implemented method of claim 13, the method further comprising:
receiving, from the second user, a request to view a set of encrypted data records on the blockchain;
receiving authentication credentials from the second user, wherein the authentication credentials comprises a cryptographic key;
determining, based on validating the authentication credentials of the second user, that the second user is authorized to access the set of encrypted data records; and
decrypting the set of encrypted data records using the cryptographic key.

17. The computer-implemented method of claim 13, the method further comprising:
detecting that a status of the first transaction has been changed; and
displaying, via a graphical interface, a second notification to the first user through the blockchain dashboard.

18. The computer-implemented method according to claim 13, wherein the computer-implemented method further comprises:
detecting, through a smart contract, that the data file has been appended to the blockchain;
based on detecting that the data file has been appended to the blockchain, transmitting a second push notification to the second user using the smart contract, wherein the second push notification comprises a second interactive link that, when activated on a second user device associated with the second user, opens a second window within a blockchain dashboard on the second user device, wherein the second window is configured to allow the second user to submit an approval of the data file from the second user by electronically signing the data file;
an executable portion for receiving, from the second user through the second interactive link, an electronic signature associated with the data file;
receiving, from the second user through the second interactive link, an electronic signature associated with the data file;
appending a record of the electronic signature to the blockchain; and
providing, using a blockchain pier associated with the first user, selective access to the data file to the first user.

* * * * *